Figure 1:
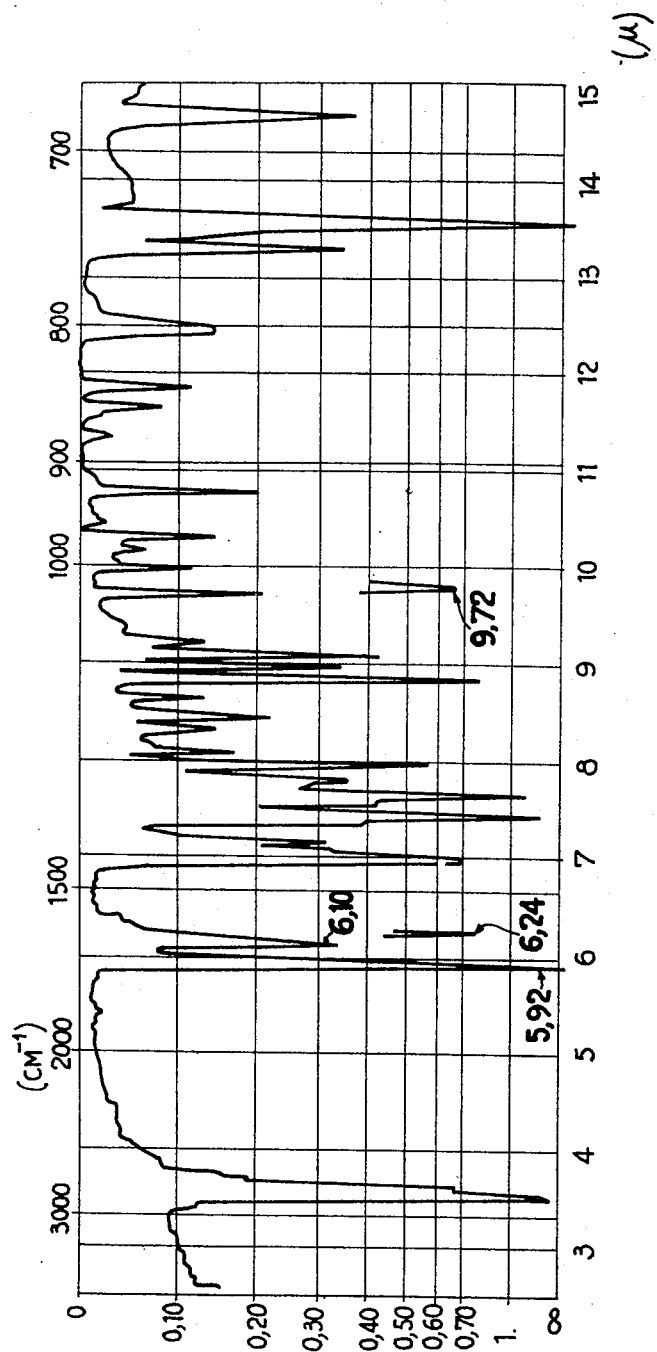

United States Patent [19]

Thal et al.

[11] 3,755,335

[45] Aug. 28, 1973

[54] CERTAIN 1,2,3,5,6,12,13A-OCTAHYDRO-12-OXO-[3,2,1-D,E]PYRIDO-[1,5]-NAPHTHYRIDINES

[75] Inventors: Claude Thal, Malakoff; Pierre Potier, Bois D'Arcy; Henri Philippe Husson, Chevreuse, all of France

[73] Assignee: Anvar-Agence Nationale de Valorisation de la Recherche, Paris, France

[22] Filed: Mar. 17, 1971

[21] Appl. No.: 125,029

[30] Foreign Application Priority Data

Mar. 26, 1970 France .............................. 7010846

[52] U.S. Cl..... 260/293.53, 260/295 A, 260/295 B, 424/267
[51] Int. Cl........................................... C07d 29/22
[58] Field of Search.................... 260/295 A, 293.53

[56] References Cited
OTHER PUBLICATIONS

Bartlett et al., J. Am. Chem. Soc., Vol. 82, pages 5941-5946, (1960) QDI A 5

Trutneva et al., Chem. Abstracts, Vol. 65, 6123a–e, Aug. 1966.

Primary Examiner—Alan L. Rotman
Attorney—Holman & Stern

[57] ABSTRACT

The invention relates to new indole derivatives which are useful therapeutical agents.

Said new derivatives are 1,2,3,5,6,12,13,13a-octahydro-12-oxo-[3,2,1-d,e]-indolo-[3,2,1-i,j]-pyrido-[1,5]-naphthyridines having the general formula

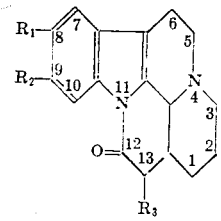

in which $R_1$ and $R_2$, which may be the same or different, are selected from H, OH and $OCH_3$, and $R_3$ is selected from H, Cl, Br and $—COCO_2C_2H_5$.

3 Claims, 2 Drawing Figures

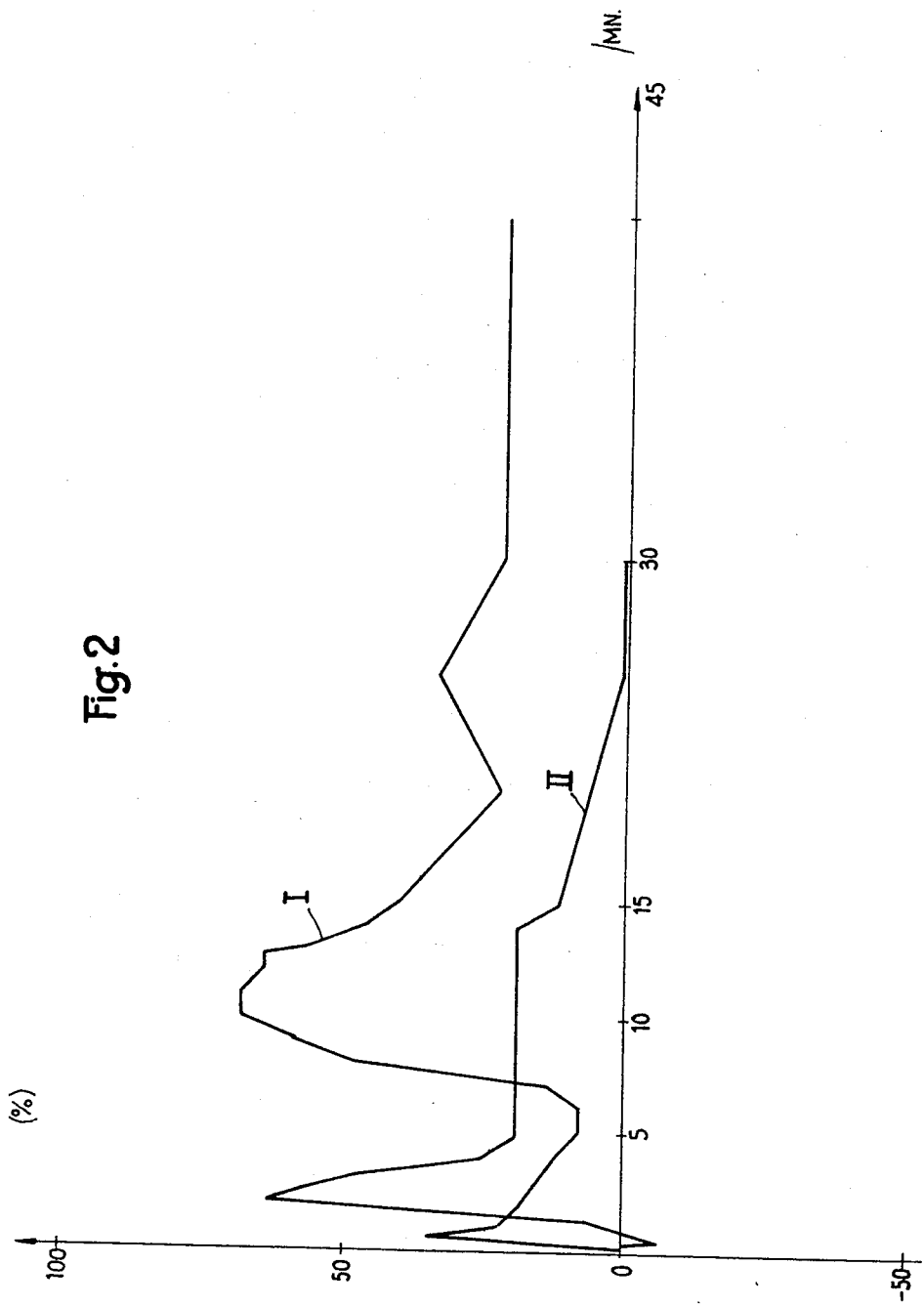

CERTAIN 1,2,3,5,6,12,13A-OCTAHYDRO-12-OXO-[3,2,1-D,E]PYRIDO-[1,5]-NAPHTHYRIDINES

This invention is concerned with new indole derivatives and their non-toxic acid addition salts with pharmaceutically acceptable acids, a process for their preparation and a therapeutic composition containing same.

The new indole derivatives according to the invention are 1,2,3,5,6,12,13,13a-octahydro-12-oxo-[3,2,1-d,e]-indolo-[3,2,1,-i,j]-pyrido-[1,5]-naphthyridines having the following general formula:

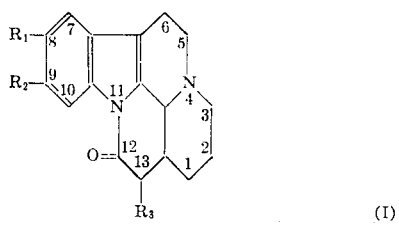

(I)

in which $R_1$ and $R_2$, which may be the same or different, are selected from H, OH and $OCH_3$, and $R_3$ is selected from H, Cl, Br and $-COCO_2C_2H_5$.

The invention encompasses all the enantiomers of derivatives of formula (I) and their acid addition salts with pharmaceutically acceptable acids.

The new derivatives according to the invention possess vaso-regulator properties, particularly at the cerebral level, which make them useful therapeutical agents.

The process for the preparation of derivatives of formula (I) according to the invention comprises hydrogenating an indole-derived pyridinium salt having the following general formula:

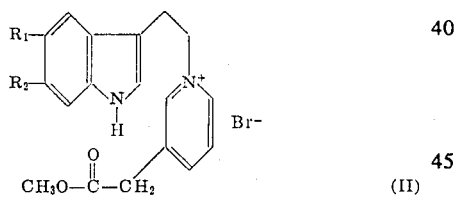

(II)

in which $R_1$ and $R_2$ have the above-defined meanings, to give a compound of the formula:

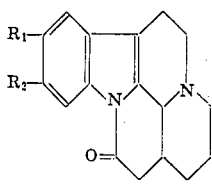

which is optionally oxalylated to give the corresponding derivative of formula (I) in which $R_3$ is $-CO-CO_2C_2H_5$, this last derivative being optionally brominated or chlorinated to give the corresponding derivative of formula (I) in which $R_3$ is Br or Cl.

According to an advantageous embodiment of the process according to the present invention, the indole-derived pyridinium salt is hydrogenated under a hydrogen atmosphere and in the presence of platinum, within methanol containing dissolved hydrogen chloride gas.

The invention relates also to a therapeutic composition having in particular a vaso-regulator activity and useful for the treatment of circulatory disorders, particularly at the cerebral level, comprising a derivative of formula (I) or a pharmaceutically acceptable salt thereof, together with a therapeutically administrable vehicle.

Other features of the invention will be apparent from the following detailed description.

In the accompanying drawing, given solely for illustrative purposes:

FIG. 1 represents the I.R. absorption spectrum (absorption as a function of wavelength) of one of the compounds according to the invention; and FIG. 2 illustrates some of the physiological activities of this same compound.

The new indole derivatives according to the invention exhibit the following general formula:

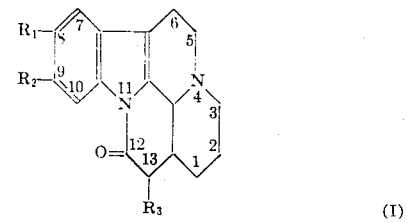

(I)

in which $R_1$ and $R_2$, which may be the same or different, are selected from H, OH and $OCH_3$ and $R_3$ is selected from H, Cl, Br and $-COCO_2C_2H_5$.

Said derivatives are produced by hydrogenation of an indole-derived pyridinium salt having the following general formula:

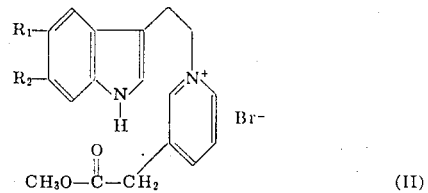

(II)

in which substituents $R_1$ and $R_2$ have the above-defined meanings, the hydrogenation being carried out typically under a hydrogen atmosphere at ordinary temperature and pressure and in the presence of platinum as catalyst, after dissolution of the salt in methanol containing dissolved hydrogen chloride gas, the hydrogenation being followed, if desired, by an oxalylation and the resulting derivative being, in turn, optionally brominated or chlorinated to give the corresponding derivatives of formula (I).

The result of the hydrogenation reaction, i.e., the cyclization, is entirely unexpected.

Indeed, from the constitution of the pyridinium salt, it might have been predicted that hydrogenation would result in complete saturation of the pyridine ring to pentahydropyridine or piperidine without any cyclization.

The hydrogenation reaction is advantageously carried out at ordinary temperature and pressure, with stirring under a hydrogen atmosphere.

The reaction medium, i.e., methanol containing dissolved hydrogen chloride gas, is produced either by dissolving hydrogen chloride gas in pure methanol, or by admixing a given amount of hydrogen chloride gas-saturated methanol with pure methanol.

The pyridinium salt concentration of the methanol medium is generally 1–20 percent, and preferably 8–12 percent, by weight.

Purification of the hydrogenation reaction product is advantageously effected by chromatography.

The oxalylation of the resulting product, to give the corresponding derivative in which $R_3 = -COCO_2C_2H_5$, is carried out according to the usual techniques, by means of ethyl oxalate, within ethanol, for example.

This gives the corresponding oxalylated derivative which, on treatment with N-chlorosuccinimide or N-bromosuccinimide within pyridine leads to the chlorinated or brominated derivatives at 13-position, respectively.

To prepare the starting pyridinium salt, the following procedure may be used.

In a first stage, tryptophol is treated with phosphorus bromide, according to the process of HOSHINO and SHIMODAIRA, Ann., 520, 19 (1953), which gives the following reaction scheme:

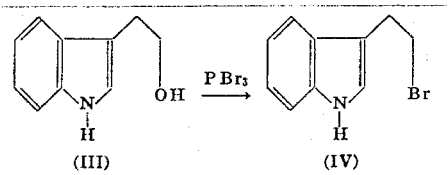

and, in a second stage, the resulting tryptophyl bromide is reacted with methyl homonicotinate, at about 80° C and under a nitrogen atmosphere, optionally within methanol, according to the process by E. WENKERT et al., Journal of Organic Chemistry, 1968, 33, page 747, which, according to the following reaction scheme:

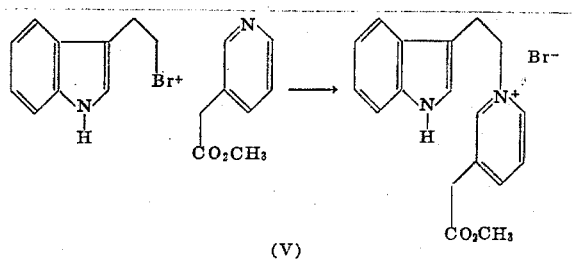

gives the desired pyridinium salt which is washed with anhydrous ether and is then recrystallized from methanol-ether.

To prepare a pyridinium salt in which substituents $R_1$ and $R_2$ are other than hydrogen, a tryptophol including such substituents is used as starting material.

To prepare the acid addition salts of compounds of formula (I) with physiologically acceptable acids, the usual techniques are used. Useful acids include, for example, hydrochloric, tartaric, maleic, succinic acids, and the like.

It should be mentioned also that the hydrogenation process according to the invention, when applied to a pyridinium salt unsubstituted with $-CH_2CO_2CH_3$ in the pyridine nucleus, leads also to a cyclization.

The practice of this invention is further illustrated by means of the following examples which are not intended to be limitations on the scope of the invention.

EXAMPLE 1

Preparation of (±)-1,2,3,5,6,12,13,13-a-octahydro-12-oxo-[3,2,1-d,e]-indolo-[3,2,1-i,j]pyrido-[1,5]-naphthyridine (named, hereinafter, Product A), of the formula:

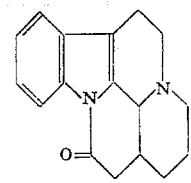

(VII)

To prepare the corresponding pyridinium salt used as starting material to be submitted to hydrogenation, a mixture of methyl homonicotinate (3.5 g) and tryptophyl bromide (2.6 g) is reacted at 80° C, during 45 hours, under a nitrogen atmosphere, the resulting solid material is washed with anhydrous ether and is then recrystallized from ethanol-ether. The melting point of the pyridinium salt is 165°–166° C.

10 g of the resulting pyridinium salt are then dissolved in absolute methanol (250 ml) including an amount of hydrogen chloride gas-saturated methanol within a range from 20 to 80 percent. This solution is stirred at ambient temperature and pressure, under a hydrogen atmosphere, during twenty hours, in the presence of platinum as catalyst, after which the catalyst is filtered off and the solvent is removed in vacuo. The residue is taken up into water (500 ml), after which, if desired, the solution is filtered and made alkaline with sodium carbonate and then repeatedly extracted with chloroform. A heterogeneous oily crude product which is chromatographically purified over neutral alumina, using benzene or benzene/cyclohexane as eluent, is isolated in a yield of approximately 50 percent.

There is obtained 7 percent of the desired product, with respect to the starting salt, said product having the following physical characteristics:

M.P. = 146° C (acetone-hexane)

I.R. spectrum (Nujol) illustrated in FIG.1 of the accompanying drawing: peaks at 5.92, 6.10 $\mu$ (the reference peaks 6.24 and 9.72 are indicated in this figure).

U.V. spectrum (alcohol): $\pi$ 243 nm ( log.$\gamma$: 4.25); 266 (3.97); 294 (3.59); 302 (3.59).

| Analysis | C | H | N |
|---|---|---|---|
| Calculated % | 76.66 | 6.81 | 10.52 |
| Found % | 76.45 | 6.65 | 10.70 |
| Mass spectrum : M⁺ 266 | | | |

Elution with benzene-chloroform makes it possible to isolate, in an amount of about 15 percent with respect to the starting salt, another indole derivative which is a new chemical compound having the formula:

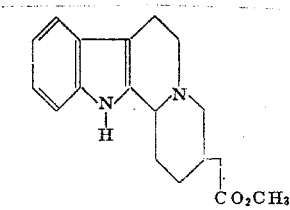

m.p. = 170° C.

The other characteristics of this product are:
I.R. spectrum (CHCl$_3$) : 1,735, 3,472 cm$^{-1}$
Mass spectrum : M$^+$ 298

Resolution of aforementioned racemic product A waS carried out using, as active acid, dextrorotatory diparatoluyltartaric acid $[\alpha]_D^{25} = +145°$ (CHCl$_3$), as follows:

For resolution purposes, 1 g of racemic base is converted to the salt form with 1.4 g of di-p-toluyltartaric acid in 120 ml of methanol. The reaction mixture is allowed to crystallize.

Isolation of the enantiomers: By successive crystallizations, (+)-1,2,3,5,6,12,13,13a-octahydro-12-oxo-[3,2,1-d,e]-indolo-[3,2,1-i,j]-pyrido-[1,5]-naphthyridine, $[\alpha]_D^{25} = +150°$ (CHCl$_3$), is isolated.

The antipode (-)-1,2,3,5,6,12,13,13a-octahydro-12-oxo-[3,2,1-d,e]-indolo-[3,2,1-i,j]-pyrido-[1,5]-naphthyridine, $[\alpha]_D^{25} = -155°$ (CHCl$_3$) is isolated from the mother-liquors.

EXAMPLE 2

Preparation of the oxalyl derivative of Product A of Example 1, having the formula:

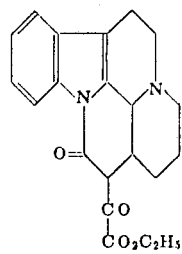

(VIII)

Ethyl oxalate (0.8 g) and Product A (1 g) from Example 1 are reacted within absolute ethanol, under a nitrogen atmosphere, during 2 hours, at room temperature, in the presence of potassium ethanolate.

There are obtained 1.5 g (90 percent of theory) of the desired oxalyl derivative, having the following characteristics:
m.p. = 142° C
Mass spectrum = M$^+$ 366.

The usefulness of the new compounds of this invention is demonstrated by the data resulting from the pharmacological investigations that were carried out with Product A of Example 1 representative of derivatives of formula (I).

I - Toxicity

The investigations carried out on the toxicity of Product A made it possible to determine that the LD$_{50}$ thereof, by the intravenous route, in mice, is about 90 mg/kg.

II - Action on cerebral circulation

This action was evidenced by using successively the method involving the determination of the cerebral rate of flow in dog and the method involving rheoencephalographic investigation.

a. Determination of the cerebral rate of flow in dog.

The method used was disclosed in ANNALES de l'UNIVERSITE et de l'A.R.E.R.S., 1969, T.7, p. 120-124, by M.DUPONT, H. EYRAUD, O. ALBERT and M.C. LEVY-APPERT-COLLIN.

According to this method, which was also the subject of a communication before the second meeting of ASSOCIATION des PHARMACOLOGISTES at CLERMONT-FERRAND, France, 1969, under press for publication in Journal de Pharmacologie, the following data are recorded simultaneously, in particular:

the variations of the rate of flow of the a.vertebralis (principal blood supply to the brain) determined by means of an electro-magnetic sensor, the venous pressure of the internal maxillary vein (reflecting changes in the cerebral circulation).

It is found that at a dosage of 10 mg/kg by the intravenous route (I.V.) Product A increases the cerebral rate of flow in a substantial, durable (thirty minutes) and reproducible manner. Curve I illustrated in FIG.2 of the accompanying drawing shows the variation of the rate of flow, in percent, as a function of time expressed in minutes.

b. Rheoencephalographic investigation

By this method are analyzed the variations of electrical impedance related to variations of the blood rate of flow; in this particular case, this method makes it possible to analyze the arterio-venous capillary circulation.

To effect this investigation, the teachings of DARDENNE and co-workers, Revue Medicale de Toulouse, 1969, pages 63-82, were taken into account.

This method makes it possible to find that at a dosage of 2 and 5 mg/kg by the intravenous route in dog, a substantial and highly durable (sixty minutes) decrease of the cerebral capillary resistance is noted.

III - Action on peripheral vasomotivity

The femoral rate of flow is measured in dog by means of electromagnetic sensors.

At the dosage of 2,5 and 5 mg/kg by the I.V. route, a substantial and durable (15-20 minutes) increase of the rate of flow may be noted, an increase which is apparent from FIG.2 (curve II).

IV - Action on respiration

The respiratory movements are examined by impedance pneumography in dog. At dosages of 5 and 10 mg/kg, there is stimulation with durable acceleration of the rhythm.

V - Action on arterial pressure

In dog, at a dosage of 10 mg/kg by the I.V. route, there is noted a rapid transient hypotension folloved by a varying hypertensive stage.

VI - Spasmolytic, sympatholytic and ganglioplegic actions on isolated organs a. on rat ileum : Product A has a contracturant effect at a dosage of 0.25-50 γ/ml, and a relaxant effect at a dosage of 100 γ/ml, it has an antagonistic effect on the action of BaCl$_2$, acetylcholine, serotonine at dosages of 25-50 γ/ml;

b. on the seminal
vesicle of rats: at a dosage of 50 γ/ml, it has an antagonistic effect on the action of adrenalin;

c. on guinea-pig
ileum : at a dosage of 0.5 γ/ml is has a contracturant effect,
at a dosage of 100 γ/ml is has a relaxant effect,
it has an antagonistic effect on the action of nicotine at 5 γ/ ml, it has an antagonistic effect on the action of histamine at 25 γ/ml.

It is apparent from the above tests that Product A possesses spasmolytic, antiserotonine, sympatholytic, ganglioplegic and antihistaminic effects at markedly contracturant dosages.

The high therapeutical usefulness of Product A is apparent from the following Table in which the various aforementioned activities of Product A are compared with the corresponding activities of two known products of same type, i.e., eburnamonine and vincamine.

TABLE

|  | Vincamine 2.5-5 mg | Eburnamonine 1-2.5 mg | Product A 5-10 mg |
|---|---|---|---|
| $LD_{50}$ (mg/kg) (I.V. in mice) | 96.50 | 13.50 | 90 |
| Cerebral rate of flow | marked ↗variable short lasting | moderate ↗variable short lasting | substantial ↗ constant durable |
| Cerebral capillary resistance | ↘marked durable | ↘slight short lasting | ↘substantial highly durable |
| Femoral rate of flow | moderate ↗variable durable | slight ↗variable short lasting | substantial ↗ durable |
| Arterial pressure | substantial ↘ rapid transient | ↘slight followed by slight↗ | ↘rapid followed by variable↗ |

Note: ↗ = increase
↘ = decrease

Thus, the derivatives of the invention may be used as drugs for the treatment of circulatory disorders, particularly at the cerebral level.

The therapeutic composition according to the invention may be administered by the oral, parenteral or rectal route, in unit dosage form, each unit dose containing 1–20 mg, and preferably 5–10 mg of active ingredient. The daily dosage regimen will generally be of the order of 2–3 unit doses.

Examples of pharmaceutical forms of the composition according to the invention are given hereinafter:

Oral route: tablets containing each 5 mg active material

| Product A | 1.000 kg |
|---|---|
| Lactose | 16.000 kg |
| Maize starch | 2.400 kg |
| Talc | 0.400 kg |
| Magnesium stearate | 0.200 kg |

Mix Product A with the lactose and starch. Wet and granulate. Dry at 45° C. Sieve. Add the talc and magnesium stearate.

Daily dosage regimen: 2 to 5 tablets daily

Injectable route: Injectable solution, 10 mg active material per unit dose

| Product A, hydrochloride | 0.5 g |
|---|---|
| Water for injectable preparation, to make | 100 ml |

Dissolve. Filter through sterilizing MILLIPORE filter. Distribute into 2 ml ampoules. Sterilize in an autoclave at 105° C, during one-half hour.

Daily dosage regimen: 1 ampoule daily, by the I.M. or I.V. route

Rectal route: Suppositories containing each 20 mg active material

| Product A | 20 g |
|---|---|
| Semisynthetic glycerides | 1 kg |

Mix Product A with a small amount of melted excipient at 50° C. Combine this mixture with the remaining amount of melted excipient. Cast into suitable moulds, to obtain suppositories weighing 1 g each, which are then cooled.

Daily dosage regimen: 1 suppository daily.

We claim:

1. A compound selected from the group consisting of indole derivatives having the formula:

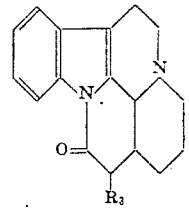

in which $R_3$ is selected from the group consisting of H and $-COCO_2C_2H_5$, and their acid addition salts with non-toxic therapeutically acceptable acids.

2. (±)-1,2,3,5,6,12,13a-octahydro-12-oxo-13-ethoxalyl-[3,2,1-d,e]-indolo-[3,2,1-i,j]-pyrido-[1,5]-naphthyridine, having the formula:

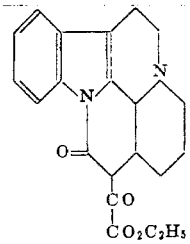

3. (±)-1,2,3,5,6,12,13,13a-octahydro-12-oxo-[3,2,1-d,e]-indolo-[3,2,1-i,j]-pyrido-[1,5]-naphthyridine, having the formula:

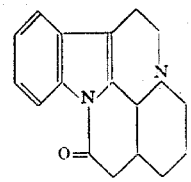

(VIII)

and its dextrorotatory and laevorotatory enantiomers.

* * * * *